(12) United States Patent
Meyer et al.

(10) Patent No.: US 10,871,556 B2
(45) Date of Patent: Dec. 22, 2020

(54) ANGULAR SENSOR FOR DETECTING POSITION OF ROTATION USING RADAR TECHNOLOGY

(71) Applicant: Siemens Aktiengesellschaft, Munich (DE)

(72) Inventors: Martin Meyer, Nuremberg (DE); Jürgen Zettner, Veitsbronn (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 16/763,481

(22) PCT Filed: Oct. 18, 2018

(86) PCT No.: PCT/EP2018/078574
§ 371 (c)(1),
(2) Date: May 12, 2020

(87) PCT Pub. No.: WO2019/091743
PCT Pub. Date: May 16, 2019

(65) Prior Publication Data
US 2020/0300999 A1    Sep. 24, 2020

(30) Foreign Application Priority Data
Nov. 13, 2017 (EP) .................... 17201285

(51) Int. Cl.
*G01S 13/06* (2006.01)
*G01D 5/48* (2006.01)
(52) U.S. Cl.
CPC ............ *G01S 13/06* (2013.01); *G01D 5/48* (2013.01)

(58) Field of Classification Search
CPC .......... G01S 13/931; G01S 2013/9327; G01S 13/06; G01D 5/48
See application file for complete search history.

(56) References Cited

U.S. PATENT DOCUMENTS 5,285,189 A * 2/1994 Nowicki ............. A44B 15/005
  200/61.22
5,764,162 A * 6/1998 Ehrlich ................. B61L 1/165
  246/122 R (Continued)

FOREIGN PATENT DOCUMENTS

DE  10 2013 202 765 A1  8/2014
DE  10 2013 209 364 A1  11/2014
DE  10 2016 202 052 B3  4/2017

OTHER PUBLICATIONS

Microwave Symposium Digest, Seattle 2013 IEEE MTTS International, Dual Tone Approach for Unambiguous Six-Port Based Interferometric Distance Measurements von S. Lindner, F. Barbon, S. Mann, G. Vinci, R. Weigel, and A. Koelpin, Institute for Electronics Engineering University of Erlangen-Nuremberg, 91058 Erlangen, Germany, Email: flindner, barbon, mann, vinci, weigel, koelping@ite.eei.uni-erlangen.de, pp. 1-4; 2013.

(Continued)

*Primary Examiner* — Peter M Bythrow
(74) *Attorney, Agent, or Firm* — Henry M. Feiereisen LLC

(57) ABSTRACT

An angular sensor includes a base body in which a rotating element is mounted for rotation about an axis of rotation. At least one transmitting antennae is arranged on the base body and each emits a transmission signal. A reflector element extends over part of the periphery, observed tangentially in relation to the axis of rotation, reflects each transmission signal, and is arranged on the rotating element, at a radial reflector distance from the axis of rotation. A plurality of (Continued)

receiving antennae are arranged on the base body, the receiving antennae receiving the reflected signals as a receiving signal and supplying the receiving signal to an evaluation device. The evaluation device determines the position of rotation of the rotating element by evaluating only the receiving signals or by evaluating the receiving signals and base signals determined on the basis of the transmission signals.

10 Claims, 5 Drawing Sheets

(56) References Cited

U.S. PATENT DOCUMENTS

| | | | | |
|---|---|---|---|---|
| 5,777,220 | A * | 7/1998 | Matrascia | G01M 17/022 |
| | | | | 73/146 |
| 5,922,949 | A * | 7/1999 | Nakajima | B60C 23/061 |
| | | | | 340/444 |
| 6,257,374 | B1 * | 7/2001 | Strzelczyk | B60T 17/221 |
| | | | | 188/1.11 E |
| 7,082,819 | B2 * | 8/2006 | Thiesen | B60C 11/24 |
| | | | | 340/870.01 |
| 7,554,324 | B2 * | 6/2009 | Gualtieri | F01D 17/02 |
| | | | | 324/207.16 |
| 7,825,669 | B2 * | 11/2010 | Parsons | G01S 13/87 |
| | | | | 324/644 |
| 7,889,119 | B2 * | 2/2011 | Evers | G01B 15/00 |
| | | | | 342/118 |
| 8,692,706 | B2 * | 4/2014 | Hecker | B60G 17/01933 |
| | | | | 342/70 |
| 9,453,500 | B2 * | 9/2016 | Newman | F03D 17/00 |
| 9,834,045 | B2 * | 12/2017 | Freytag | G01M 17/02 |
| 9,856,859 | B2 * | 1/2018 | Vangen | G01S 13/584 |
| 9,856,860 | B2 * | 1/2018 | Vangen | F03D 17/00 |
| 10,286,735 | B2 * | 5/2019 | Guinart | G01M 17/02 |
| 10,399,393 | B1 * | 9/2019 | Trotta | B60C 23/0461 |
| 2002/0189336 | A1 * | 12/2002 | McEwan | G01M 17/027 |
| | | | | 73/146 |
| 2003/0154007 | A1 * | 8/2003 | Evans | B60T 8/1725 |
| | | | | 701/514 |
| 2004/0168512 | A1 * | 9/2004 | McEwan | G01M 17/027 |
| | | | | 73/146 |
| 2005/0120787 | A1 * | 6/2005 | Thiesen | B60C 11/24 |
| | | | | 73/146.5 |
| 2006/0042734 | A1 * | 3/2006 | Turner | B60C 11/24 |
| | | | | 152/154.2 |
| 2007/0132461 | A1 * | 6/2007 | Holmquist | F01D 21/003 |
| | | | | 324/644 |
| 2008/0101930 | A1 * | 5/2008 | Bosche | F03D 7/0288 |
| | | | | 416/31 |
| 2010/0253569 | A1 * | 10/2010 | Stiesdal | G01B 11/026 |
| | | | | 342/118 |
| 2011/0090110 | A1 * | 4/2011 | Tralshawala | G01S 13/90 |
| | | | | 342/25 A |
| 2011/0175768 | A1 * | 7/2011 | Peczalski | G01S 13/88 |
| | | | | 342/118 |
| 2014/0232417 | A1 | 8/2014 | Halder et al. | |
| 2014/0347035 | A1 | 11/2014 | Halder et al. | |
| 2016/0138946 | A1 | 5/2016 | Grau | |
| 2016/0146279 | A1 * | 5/2016 | Philpott | B60T 8/885 |
| | | | | 188/1.11 L |
| 2017/0097223 | A1 * | 4/2017 | Darrer | G01B 17/00 |
| 2018/0031066 | A1 * | 2/2018 | Lin | G06F 9/455 |

OTHER PUBLICATIONS

Institute for Electronics Engineering, Wide-Range, Dual Six-Port based Direction-of-Arrival Detector von Gabor Vinci et al., The 7th German Microwave Conference (GeMiC), Gabor Vinci, Francesco Barbon, Benjamin Laemmle, Robert Weigel, and Alexander Koelpin, University of Erlangen-Nuremberg, Cauerstr. 9, 91058 Erlangen, Germany, gabor.vinci@ieee.org, barbon@lfte.de, benjamin.laemmle@ieee.org, weigel@lfte.de, koelpin@lfte.de, Ilmenau 2012, pp. 1 bis 4.; 2012.

Institute for Electronics Engineering, Six-Port Technology for Precise Geometrical Measurement Applications—an Overview, Alexander Koelpin, Gabor Vinci, Stefan Lindner, Sebastian Mann, Francesco Barbon, Sarah Linz, Florian Oesterle, and Robert Weigel Friedrich-Alexander University of Erlangen-Nuremberg Cauerstraße 9, D-91058 Erlangen, Germany Email: alexander.koelpin@fae.de, Oct. 7-10, 2013, pp. 1586-; 2013.

Zess, Centre for Sensorsystems, Phase unwrapping for sar interferometry a data fusion approach by kalman filtering, Prof. Dr.-Ing. Habil. Othmar Loffeld , Siegen, Germany, pp. 1-20.

PCT International Search Report and Written Opinon of International Searching Authority dated Jan. 23, 2019 corresponding to PCT International Application No. PCT/EP 2018/078574 filed Oct. 18, 2018.

* cited by examiner

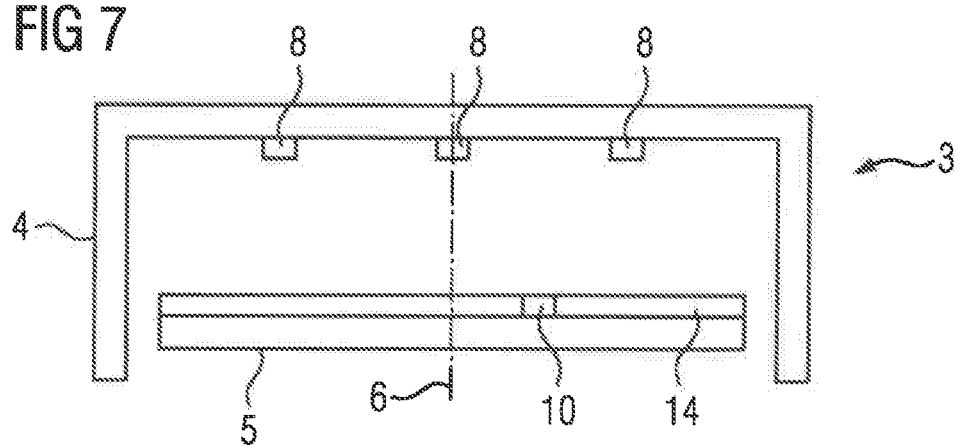

ANGULAR SENSOR FOR DETECTING POSITION OF ROTATION USING RADAR TECHNOLOGY

CROSS-REFERENCES TO RELATED APPLICATIONS

This application is the U.S. National Stage of International Application No. PCT/EP2018/078574, filed Oct. 18, 2018, which designated the United States and has been published as International Publication No. WO 2019/091743 A1 and which claims the priority of European Patent Application, Serial No. 17201285.8, filed Nov. 13, 2017, pursuant to 35 U.S.C. 119(a)-(d).

BACKGROUND OF THE INVENTION

The present invention relates to an angular sensor,
wherein the angular sensor has a base body and a rotating element,
wherein the rotating element is mounted in the base body such that the rotating element can be rotated about an axis of rotation,
wherein a number of transmitting antennae that each emit a transmission signal is arranged on the base body,
wherein a plurality of receiving antennae that each receive a first receiving signal and each supply their first receiving signal to an evaluation device is arranged on the base body, and
wherein the evaluation device determines the position of rotation of the rotating element by evaluating only the first receiving signals supplied thereto or by evaluating the first receiving signals supplied thereto and first base signals determined on the basis of the first transmission signals.

Such an angular sensor is known from US 2016/0138 946 A1.

Angular sensors are necessary for a multiplicity of applications. For example, in electric machines the mechanical angle of rotation must be measured for positioning tasks and as feedback for current control. For example, optical, magnetic, inductive or capacitive angular sensors are generally used for servo drives. In many cases, the angular sensors are independent components in which the base body of the angular sensor is connected to a base body of the machine and the rotating element of the angular sensor to the rotary shaft of the machine, the position of rotation of which is to be detected. In some cases, the angular sensors are integral components of the machine.

Regardless of whether one or the other approach is taken, the angular sensors always consist of a detection unit that scans a material measure. The detection unit is arranged on the base body of the angular sensor, the material measure on the rotating element of the angular sensor. It is possible that the angular sensor itself determines the position of rotation and transfers it to a controller. Alternatively, the angular sensor can forward raw signals—for example sine and cosine signals—from which another device, for example the control mentioned, then determines the position of rotation.

The known angular sensors have various disadvantages.

Thus, for example, high-precision optical sensors are cost-intensive as generally a highly accurate assembly of the detection unit relative to the material measure is required. In the case of the embodiment as an integrated angular sensor, such a sensor is susceptible to dirt and must be encapsulated in a complex manner by the manufacturer of the machine.

The material measures must be elaborately produced for a high degree of accuracy in the range of 18 bits and more, usually in microstructure technology, as the structure sizes become increasingly small as the accuracy class increases. This applies in particular in the case of optical structures in the micrometer range to be scanned transmissively or reflexively. In the case of an embodiment of the material measure as a coded multipole magnetic wheel or multipole gear or as an inductive or capacitive printed circuit board structure, scanning at a very short distance from the material measure is required. Such scans are often not suitable for industrial applications.

Furthermore, the material measures should always be smaller in order to minimize the passive installation space which is not used for the actual purpose of the machine (for example, the application of a torque).

Conventional material measures are scanned by means of a scanning unit, in some cases also by means of several scanning units. The coding tracks of the material measures are usually arranged within a small area in a circle in parallel, in series or as so-called Vernier coils.

Within the scope of linear distance measurement, measuring methods and measuring arrangements are also known which use a phase-measuring radar technology in a waveguide in order to detect distances of several meters with a positioning resolution of a few micrometers during positioning tasks. Reference may be made purely by way of example to DE 10 2013 209 364 A1 and to DE 10 2013 202 765 A1. Such measuring arrangements comprise a sensor for receiving an electromagnetic wave and a guide part for guiding the electromagnetic wave. The guide part is designed as an elongated waveguide. It is preferably made of metal or has a metallic coating. The guide part has a slot in the longitudinal direction, which slot serves to guide the electromagnetic wave. The receiving signal can be evaluated, for example, with the so-called 6-port circuit.

The object of the present invention is to provide an angular sensor which makes it possible to determine the position of rotation of the rotating element of the angular sensor in a simple and reliable manner with high accuracy.

SUMMARY OF THE INVENTION

The object is achieved by an angular sensor as set forth hereinafter. Advantageous embodiments of the angular sensor are the subject of the dependent claims.

According to the invention, an angular sensor of the type mentioned at the outset is designed such that
on the rotating element at a radial reflector distance from the axis of rotation, a reflector element is arranged which, viewed tangentially to the axis of rotation, extends only over part of the periphery, which reflects the respective first transmission signal emitted by the respective transmitting antenna, and
the receiving antennae receive the signal reflected by the reflector element as a respective first receiving signal.

In essence, the position of rotation is therefore concluded from the variation of the distance of the reflector element from the receiving antennae as a function of the position of rotation.

The receiving antennae are preferably arranged on the base body so as to be two-dimensionally distributed, viewed orthogonally to the axis of rotation. As a result, the position of rotation can be determined more accurately. This applies in particular when the receiving antennae on the base are arranged in the form of a two-dimensional array with a plurality of rows and a plurality of columns. In principle, however, this also applies if the receiving antennae also have a height distribution along the axis of rotation in addition to the distribution in the plane running orthogonally to the axis of rotation.

The evaluation device preferably forms pairs of first signals, each of which consists of two first receiving signals or of a first receiving signal and a first base signal, determines a phase difference between the phases of the respective pair in each case and determines the rotational position of the rotary element by evaluating the phase differences. By means of this procedure, a highly accurate evaluation is possible. This applies in particular if the evaluation device is designed with respect to the evaluation of the respective pair of first signals as a circuit operating according to the 6-port method. By means of a circuit operating according to the 6-port method, a very simple highly accurate determination of the phase difference and correspondingly, a very simple highly accurate determination of the position of rotation of the rotating element, is possible.

The 6-port method and the associate circuit are generally known as such. Reference may be made—purely by way of example—to the following specialist articles:

"Six-Port Technology for Precise Geometrical Measurement Applications—an Overview" by Alexander Koelpin et al., published in the Proceedings of the 43rd European Microwave Conference, 7-10 Oct. 2013, Nuremberg, Germany, "Wide-Range, Dual Six-Port based Direction-Of-Arrival Detector" by Gabor Vinci et al., The 7th German Microwave Conference (GeMiC), Ilmenau 2012, pages 1 to 4, and "Dual Tone Approach for Unambiguous Six-Port Based Interferometric Distance Measurements" by S. Lindner et al., Microwave Symposium Digest, Seattle 2013 IEEE MTTS International.

The respective first transmission signal has a respective first signal frequency. The arrangement of the transmitting antennae and the receiving antennae and the first signal frequencies are preferably coordinated with one another in such a way that, for at least two of the pairs of first signals, the phase difference between the phases of the first signals of the respective pair varies by less than 360° during a complete revolution of the reflector element about the axis of rotation. As a result, it is not necessary to detect phase overflows during the rotation of the rotating element and to determine a resulting phase difference by the utilization thereof, which then extends overall over more than 360°. Rather, the determined phase difference can already be used directly as such without further modification.

In some embodiments, it is possible for the evaluation device to additionally determine an axial reflector distance and/or the radial reflector distance of the reflector element from the transmitting antennae and the receiving antennae on the basis of the phase differences of the first signals and to determine the rotational position of the rotating element taking into account the determined axial and/or radial reflector distance. As a result, the rotational position of the rotary element can be determined more accurately.

It is possible that the transmitting antennae also emit a respective second transmission signal which has a different signal frequency from the respective first transmission signal, and furthermore, an annular element which extends annularly about the axis of rotation is arranged on the rotary element in addition to the reflector element at a radial annular distance from the axis of rotation, which ring element reflects the respective second transmission signal emitted by the respective transmission antenna. In this case, the angular sensor is preferably designed in such a way that the receiving antennae receive the signal reflected by the annular element as a respective second receiving signal and supply their respective second receiving signal to the evaluation device and the evaluation device corrects the radial reflector distance by evaluating only the second receiving signals supplied to it or by evaluating the second receiving signals supplied to it and second base signals determined on the basis of the second transmission signals, and/or determines an axial reflector distance of the reflector element from the transmitting antennae and the receiving antennae and determines the rotational position of the rotating element using the determined radial reflector distance and/or the determined axial reflector distance.

This procedure makes it possible to determine the position of rotation of the rotating element more precisely.

Absorber structures for absorbing the transmission signals emitted by the transmitting antennae are preferably arranged on the base body and/or on the rotating element. As a result, interference reflections can be reduced or avoided, and the signal-to-noise ratio maximized.

It is possible that the reflector element is arranged on the rotating element in a raised or recessed manner. Alternatively, for example, it is possible that the reflector element is integrated into a printed circuit board structure arranged on the rotating element. However, other embodiments are also possible.

BRIEF DESCRIPTION OF THE DRAWING

The properties, features and advantages of this invention described above and the manner in which these are achieved, will be more clearly understood in connection with the following description of the exemplary embodiments which are explained in more detail in connection with the diagrams. The diagrams show a diagrammatic view of:

FIG. 7 a further modification of the angular sensor from FIG. 2.

DETAILED DESCRIPTION OF PREFERRED EMBODIMENTS

Figure 1:
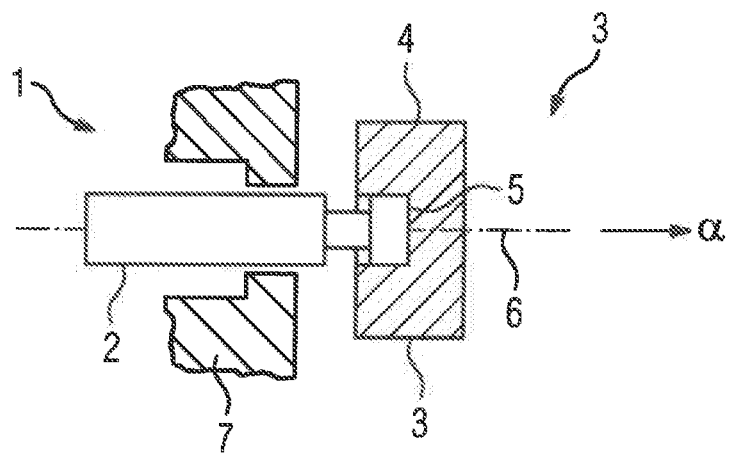
FIG. 1 a machine with an angular sensor.

According to FIG. 1, a machine 1 has a shaft 2, the angle of rotation or position of rotation α of which is to be detected. An angular sensor 3 is provided for this purpose. According to FIGS. 1 and 2, the angular sensor 3 has a base body 4 in which a rotating element 5 is mounted. The rotating element 5 can be rotated about an axis of rotation 6 by this means. The base body 4 can be connected to a housing 7 of the machine 1—for example, by means of screws. The rotating element 5 can be connected to the shaft 2 of the machine 1—for example, likewise via screws. The rotating element 5 is connected to the shaft 2 of the machine 1 such that the axis of rotation 6 coincides as well as possible with the axis of rotation of the shaft 2 of the machine 1. For clarification, it is pointed out that the term "shaft" is used with respect to the shaft 2 of the machine 1 in the sense of the mechanical element, not in the sense of a propagating oscillation.

Insofar as the terms "axial", "radial" and "tangential" are used below, they are always related to the axis of rotation 6. "Axial" is a direction parallel to the axis of rotation 6. "Radial" is a direction orthogonal to the axis of rotation 6 directly toward or away from the axis of rotation 6. "Tangential" is a direction which is both orthogonal to the axial direction and orthogonal to the radial direction. "Tangential" is therefore a direction which is directed circularly around the axis of rotation 6 at a constant axial position and at a constant radial distance.

Figure 2:
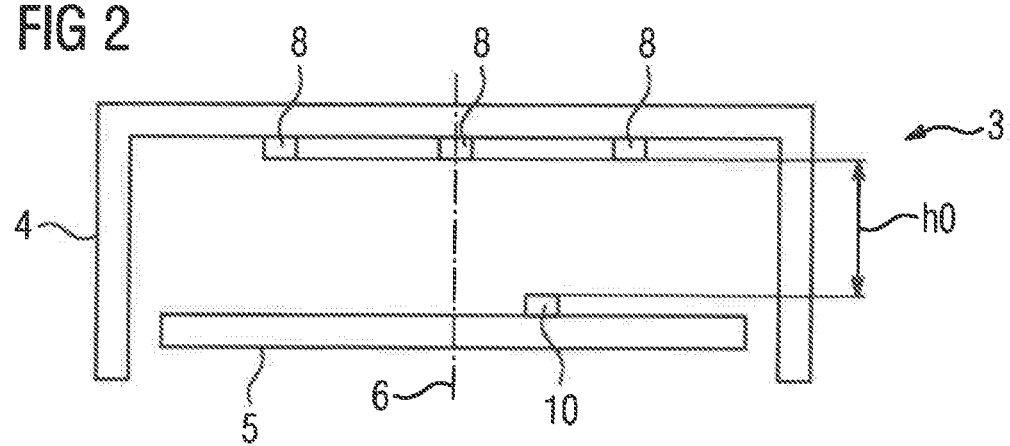
FIG. 2 the angular sensor from FIG. 1 enlarged.
Figure 3:
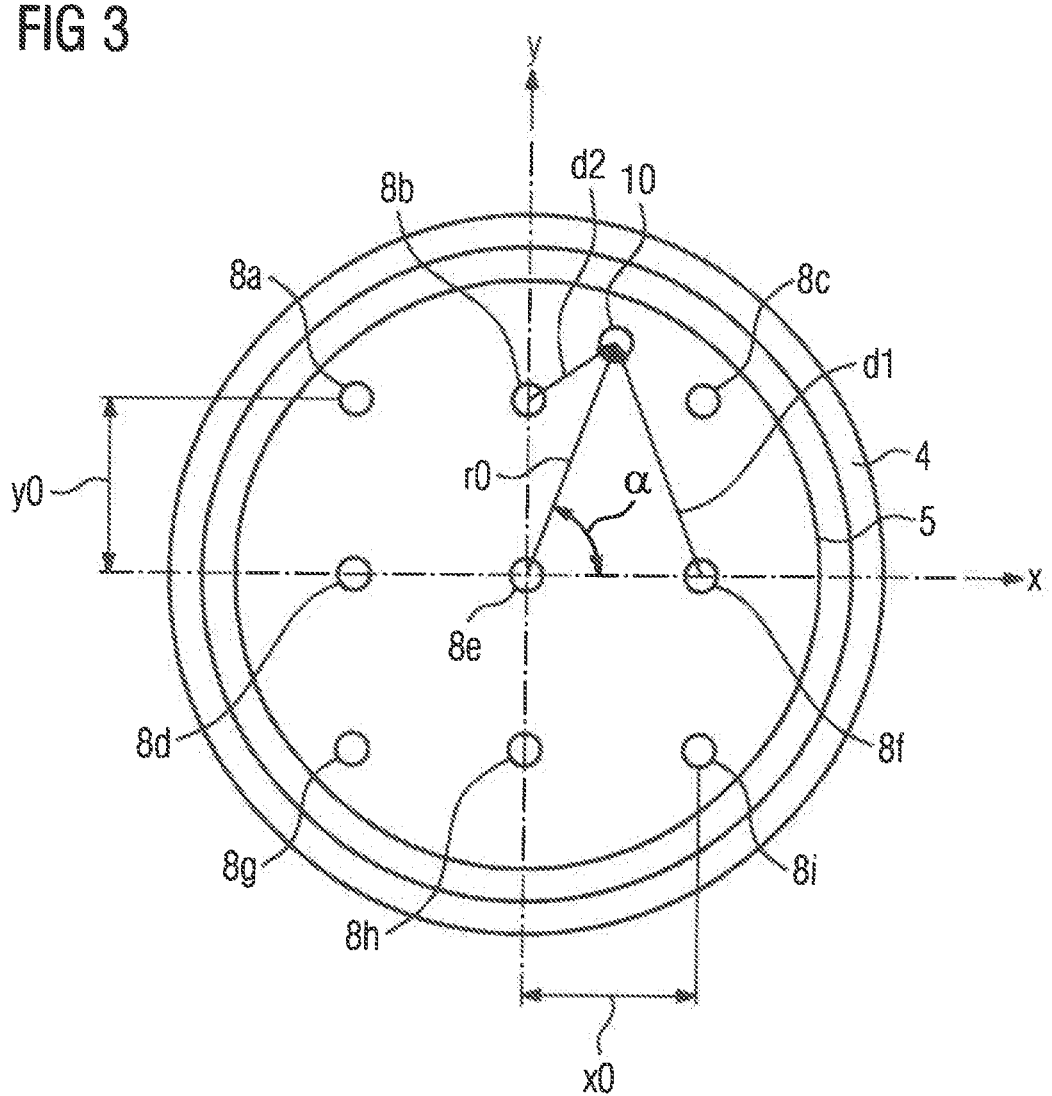
FIG. 3 a plan view of the angular sensor from FIG. 1.

According to FIG. 2 and FIG. 3, antennae 8 are arranged on the base body 4. The antennae 8 are each supplemented by a small letter (a to i) in FIGS. 2 and 3 in order to be able to distinguish them from one another if required. At least one of the antennae 8 is a transmitting antenna. At least two of the antennae 8 are receiving antennae. The terms "transmitting antenna" and "receiving antenna" are not mutually exclusive. It is therefore possible for some of the antennae 8 to be pure transmitting antennae, some antennae 8 to be pure receiving antennae and other antennae 8 to be transmitting and receiving antennae. Insofar as there is talk of transmitting antenna and receiving antennae hereinafter, the respective statement thus relates to the corresponding functionality (that is to say, transmitting or receiving) of the respective antenna 8. On the other hand, it should not be excluded that an antenna 8 which is referred to as a transmitting antenna can also act as a receiving antenna and, conversely, an antenna 8 which is referred to as a receiving antenna can also act as a transmitting antenna.

Viewed orthogonally to the axis of rotation 6, the receiving antennae 8 are arranged in a two-dimensionally distributed manner on the base body 4. In this case, it is possible for the receiving antennae 8 to be arranged in a plane running orthogonally to the axis of rotation 6. In this case, the term "two-dimensionally distributed" means that there are at least two receMng antennae 8, the respective connecting line of which forms an angle with the axis of rotation 6 which is different from both 0° and 180°. This condition is fulfilled, for example, when the antennae 8*b* and 8*f* are receiving antennae. Alternatively, it is possible that the receiving antennae 8 are also arranged in different axial positions. In this case, the above statement relates to the fact that the connecting lines of the two receiving antennae 8 form an angle with the axis of rotation 6 which is both different from 0° and 180°, to a plane into which the receiving antennae 8 are fictitiously projected.

The receiving antennae 8 are preferably arranged on the base body 4 in the form of a two-dimensional array with a plurality of rows and a plurality of columns. This is the case, for example, when all the antennae 8 shown in FIG. 3 are receiving antennae. However, the arrangement of 3×3 antennae 8 shown in FIG. 3 is purely by way of example. In general, when arranged in the form of a two-dimensional array, there can be n×m antennae 8 (with n, m>1). Certain modifications of the array are also possible. For example, in the case of five columns, the two outermost columns can each comprise three receiving antennae 8 and the middle three columns each comprise five receiving antennae 8. In this case, the "corners" of the array are cut off, so to speak.

Figure 4:
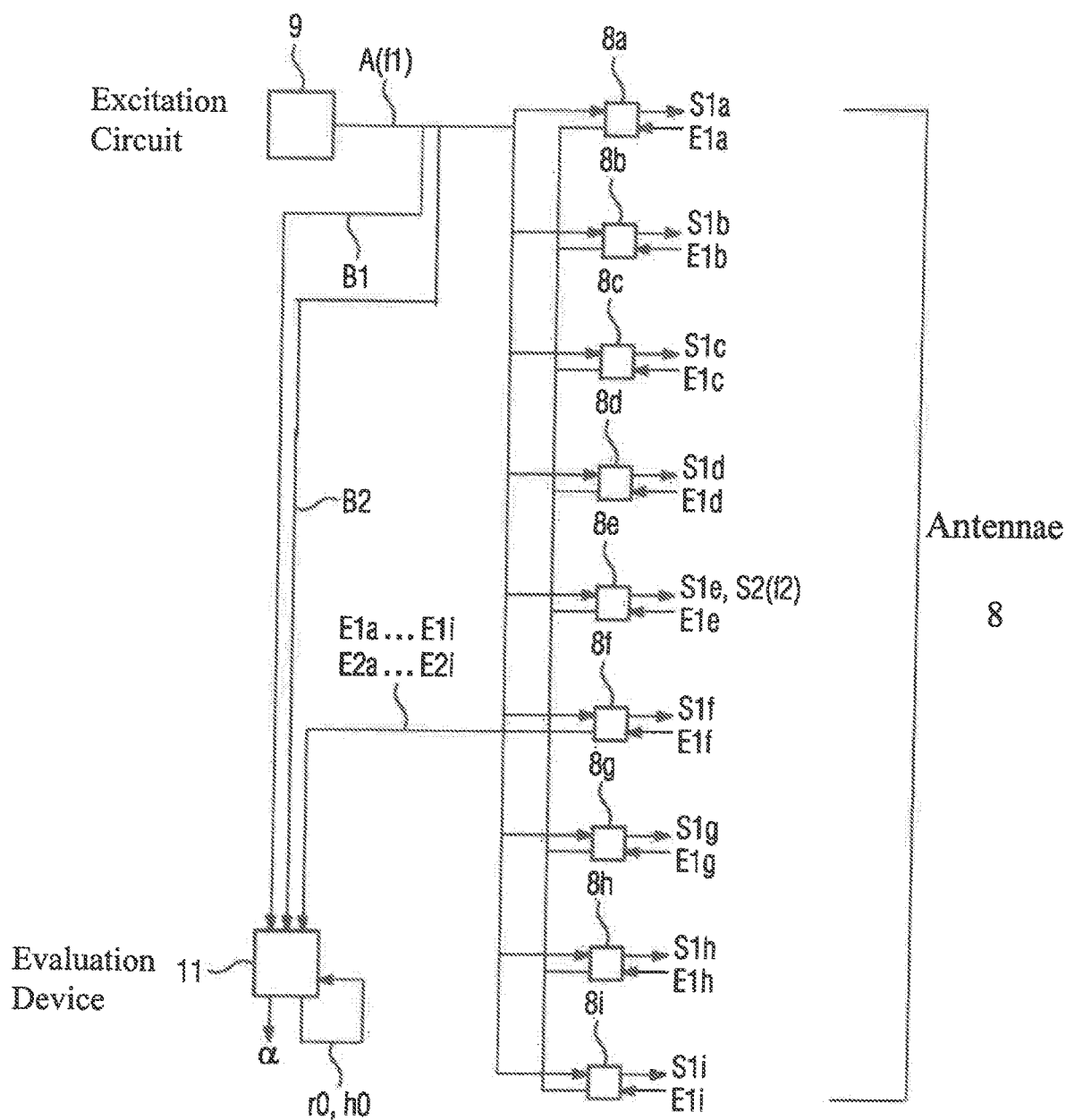
FIG. 4 a circuit implementation of the angular sensor from FIG. 1.

According to FIG. 4, an excitation circuit 9 of the angular sensor 3 generates a number of excitation signals A. The excitation signals A each have a first signal frequency f1. The first signal frequency f1 is in the high-frequency range, usually above 1 GHz, often even above 10 GHz, for example, at 12, 24 or 60 GHz. It can be predetermined in a fixed manner or adjustable. In any case, however, its exact value is known for each excitation signal A at all times. Corresponding embodiments of the excitation circuit 9, which can generate the excitation signals A with high precision with the respective first signal frequency f1, are known to those skilled in the art, for example, in the form of PLLs (Phase Locked Loop) in combination with VCOs (Voltage Controlled Oscillator) and other embodiments.

The excitation circuit 9 supplies the excitation signals A to the transmitting antennae 8. The transmitting antennae 8 thereupon emit a respective first transmission signal S1. In FIG. 4, the first transmission signals S1 are each supplemented by a small letter (a to i) in each case in order to be able to distinguish them from one another if required. If a plurality of transmitting antennae 8 emits a respective first transmission signal S1, it is possible that the transmitting antennae 8 emit their first transmission signals S1 simultaneously. In this case, the first signal frequencies f1 must be different from one another in pairs. Alternatively, the transmitting antennae 8 may emit their first transmission signals S1 sequentially one after the other. In this case, the first signal frequencies f1 may be the same or different from one another.

A reflector element 10 is arranged on the rotating element 5 at a radial reflector distance r0 from the axis of rotation 6. The reflector element 10 extends in a tangential direction only over part of the periphery, in practice over as small an angle as possible. The reflector element 10 reflects the respective first transmission signal S1 emitted by the respective transmitting antenna 8. In this case, the term "reflect" is not meant in the sense of a mirror-like reflection, but in the sense of the broadest possible spread of the respective transmission signal S1 impinging on the reflector element 10.

The receiving antennae 8 receive the signal reflected by the reflector element 10 as a respective first receiving signal E1. In FIG. 4, the first receiving signals E1 are each supplemented by small letter (a to i) in order to be able to distinguish them from one another if required. The receiving antennae 8 supply their respective first receiving signal E1 to an evaluation device 11. The evaluation device 11 then determines the position of rotation $\alpha$ of the rotating element 5. It is possible that the evaluation device 11 for determining the position of rotation $\alpha$ only evaluates the first receiving signals E1 supplied to it. Alternatively, it is possible that the evaluation device 11 for determining the position of rotation $\alpha$ evaluates the first receiving signals E1 supplied to it and additionally first base signals B1 which are determined on the basis of the first transmission signals S1 (or equivalent: of the excitation signals A). This will be explained in more detail below. First of all, a simple example is explained, from which reference is then made to embodiments.

In the context of the explanations below, in other words, of the simple example, it is first assumed that the antennae 8 are located at a uniform axial reflector distance h0 from the rotating element 5 in accordance with the illustration in FIG. 2, the antenna 8*f*, as shown in FIG. 3, is located on the x-axis at an offset x=x0 and is operated as a combined transmitting and receiving antenna, and furthermore the antenna 8*b*, as shown in FIG. 3, is located on the y-axis at an offset y=y0 and is operated purely as a receiving antenna. The two offsets x0, y0 can be between 5 mm and 20 mm, for example. They preferably have the same value. However, this is not absolutely necessary. The axial reflector distance h0 can likewise be between 5 mm and 20 mm. It can have the same value as the offsets x0, y0. However, this is not mandatory.

Based on the above-mentioned assumptions, the position of the reflector element 10 is obtained—with a still unknown position of rotation α

$$\begin{pmatrix} x \\ y \end{pmatrix} = \begin{pmatrix} r0 \cdot \cos\alpha \\ r0 \cdot \sin\alpha \end{pmatrix} \quad (1)$$

Accordingly, the distance d1 of the reflector element 10 from the antenna 8f is $$d1^2 = r0^2 + x0^2 + h0^2 - 2r0x0 \cdot \cos\alpha \quad (2)$$

By re-arranging equation 2, the following is thus obtained $$\cos\alpha = \frac{r0^2 + x0^2 + h0^2 - d1^2}{2r0x0} \quad (3)$$

Analogously, the same applies to the distance d2 of the reflector element 10 from the antenna 8b

$$d2^2 = r^2 + y0^2 + h0^2 - 2r0y0 \cdot \sin\alpha \quad (4)$$

By re-arranging equation 4, the following is therefore obtained $$\sin\alpha = \frac{r0^2 + y0^2 + h0^2 - d2^2}{2r0y0} \quad (5)$$

The position of rotation α can be determined on the basis of equations (3) and (5), provided that the associated distances d1, d2 of the reflector element 10 from the antennae 8f, 8b can be determined.

In order to determine the distance d1, for example, the first base signal B1 and the first receiving signal E1f received by the antenna 8f can be evaluated. In particular, a phase difference φ1 between the first base signal B1 and the first receiving signal E1f varies with the distance d1. In particular, the following applies to the phase difference φ1

$$\varphi 1 = \varphi 0 + \frac{2d1}{\lambda} \cdot 2\pi \quad (6)$$

λ is in this case the wavelength of the first transmission signal S1, which in turn is linked to the first signal frequency f1 by the relationship $$\lambda \cdot f1 = c \quad (7)$$

(with c=propagation speed of the transmission and receiving signals S, E1). φ0 is a phase offset. The phase offset φ0 can be determined once in advance within the scope of a calibration.

The evaluation device 11 can therefore first form the above-mentioned pair of first signals—that is to say, the first base signal B1 and the first receiving signal E1f of the antenna 8f—and determine the phase difference φ1 between the phases of this pair. The distance d1 can then be determined on the basis of the determined phase difference φ1.

Similarly, to determine the distance d2 for example, the first base signal B1 and the first receiving signal E1b received by the antenna 8b may be utilized. In particular, a phase difference φ2 between the first base signal B1 and the first receiving signal E1b varies with the distance d1 and with the distance d2. In particular, the following applies to the phase difference φ2

$$\varphi 2 = \varphi 0' + \frac{d1 + d2}{\lambda} \cdot 2\pi \quad (8)$$

φ0' is likewise a phase offset. The phase offset φ0' can also be determined once in advance in the context of a calibration.

After the determination of the distance d1, the evaluation device 11 can therefore form this pair of first signals—that is to say, the first base signal B1 and the first receiving signal E1b of the antenna 8b—and determine the phase difference φ2 between the phases of this pair. The distance d2 can then be determined in conjunction with the previously determined distance d1 on the basis of the determined phase difference φ2.

The determination of the phase differences φ1, φ2 is possible without problems. For example, the evaluation device 11 for determining the phase differences φ1, φ2 can be designed as a circuit operating according to the 6-port method. This type of evaluation is generally known. It is very reliable and accurate. As in the present case the phases φ1 and φ2 are first determined and the phases φ1 and φ2 can only be determined modulo 2π, the distance d1 can, however, only be clearly determined within half the wavelength λ using the phase φ1. Similarly—at a known distance d1—the distance d2 can only be unambiguously determined within the wavelength λ on the basis of the phase φ2. Nevertheless, the distances d1 and d2 can be unambiguously determined.

In order to be able to determine the distance d1 directly unambiguously in the context of the above example on the basis of the phase 91, the difference between the maximum and the minimum of the distance d1 must be less than half the wavelength λ. The maximum and the minimum of the distance d1 are not very easy to calculate precisely. However, regardless of the radial reflector distance r0 and regardless of the axial reflector distance h0, this condition is met if the following relationship applies:

$$2x0 < \frac{\lambda}{2} \quad (9)$$

In connection with equation 7, the determination of the distance d1 is therefore clearly possible if the relationship $$f1 < \frac{c}{4x0} \quad (10)$$

applies. For in this case, the phase difference φ1 between the first receiving signal E1f and the first base signal B1 during a complete revolution of the reflector element 10 around the axis of rotation 6 varies by less than 360°.

In order to be able to directly and unambiguously determine the distance d2 based on the phase difference φ2, it is also necessary for the phase difference φ2 between the first receiving signal E1b and the first base signal B1 to vary less than 360° during a complete revolution of the reflector element 10 around the axis of rotation 6. This condition is met when the difference between the maximum and the minimum of the sum of the distances d1 and d2 is less than the wavelength λ.

The maximum of the sum of the distances d1 and d2 is not very easy to calculate. Similarly, the minimum of the sum of the distances d1 and d2 is not very easy to calculate. However, the difference between the maximum and minimum of the sum of the distances d1 and d2 can be estimated:

$$\text{MAX}(d1+d2)-\text{MIN}(d1+d2)<2x0+2y0<\lambda \quad (11)$$

In connection with the relationship (7) and (9), the condition mentioned is therefore met when the following relationship applies:

$$f1 < \frac{c}{4y0} \quad (12)$$

In this case, the phase difference φ2 between the first receiving signal E1b and the first base signal B1 during a complete revolution of the reflector element 10 around the axis of rotation 6 also varies by less than 360°. The same result would also be produced if the antenna 8b acted as a transmitting and receiving antenna, that is to say, the signal emitted by itself would be received again. This is shown by a simple comparison of equation (12) with equation (10).

If the conditions (10) and (12) are met, the distances d1 and d2 can thus be unambiguously determined on the basis of the phase differences φ1 and φ2 and the sine and the cosine of the position of rotation α can be unambiguously determined on the basis of the distances d1 and d2. However, the position of rotation α itself can be unambiguously determined with the sine and cosine of the position of rotation α.

Even if the conditions (10) and (12) are not met, it is possible to determine the position of rotation α. For example, with sufficiently rapid detection and determination of successive phase differences φ1, φ2, it is possible to detect phase jumps and thereby, in principle, to expand the resolution range for the distances d1, d2 as desired. It is also possible to carry out the measurement of the phase differences φ1, φ2 rapidly in succession at a plurality of first signal frequencies f1 and to expand the resolution range—in principle, arbitrarily—by combining the measured values. Furthermore, it is possible to determine more than only two-phase differences. For example—whether alternatively or in addition to the phase differences φ1, φ2—the phase differences of the following pairs of first receiving signals E1 may be formed:

First receiving signals E1a and E1c,
First receiving signals E1a and E1g,
First receiving signals E1g and E1i,
First receiving signals E1c and E1i,
First receiving signals E1a and E1i,
First receiving signals E1c and E1g.

The above listing is merely exemplary. Alternatively, or additionally, other pairs of first receiving signal E1 can also be formed. Also, each of the first receiving signals E1a to E1i can be paired with the first base signal B1. Further information is obtained with each further pair of first signals B1, E1.

The additional information can be used for example, if there was previously an ambiguity or even more far-reaching ambiguity, for the unambiguous determination of the position of rotation α. It is also possible, however, to evaluate such pairs of first signals B1, E1 even if the position of rotation α can already be clearly determined from the approach. In particular, in this case it is possible not only to assume the position of rotation α as variable and thus initially unknown, but additionally also to determine the axial reflector distance h0 and/or the radial reflector distance r0 and to take these two variables h0, r0 into account in determining the position of rotation α of the rotating element 5. Both the axial reflector distance h0 and the radial reflector distance r0 should be constant. In practice, however, certain fluctuations of the radial distance r0, for example due to a slightly eccentric arrangement of the antennae 8 relative to the axis of rotation 6, can be produced during a revolution of the rotating element 5 around the axis of rotation 6. It is also possible that the rotating element 5 is not exactly orthogonal to the axis of rotation 6, so that the axial reflector distance h0 thus varies during a revolution of the rotating element 5 around axis of rotation 6. Such fluctuations can be determined when a sufficiently large number of phase differences are used.

Figure 5:
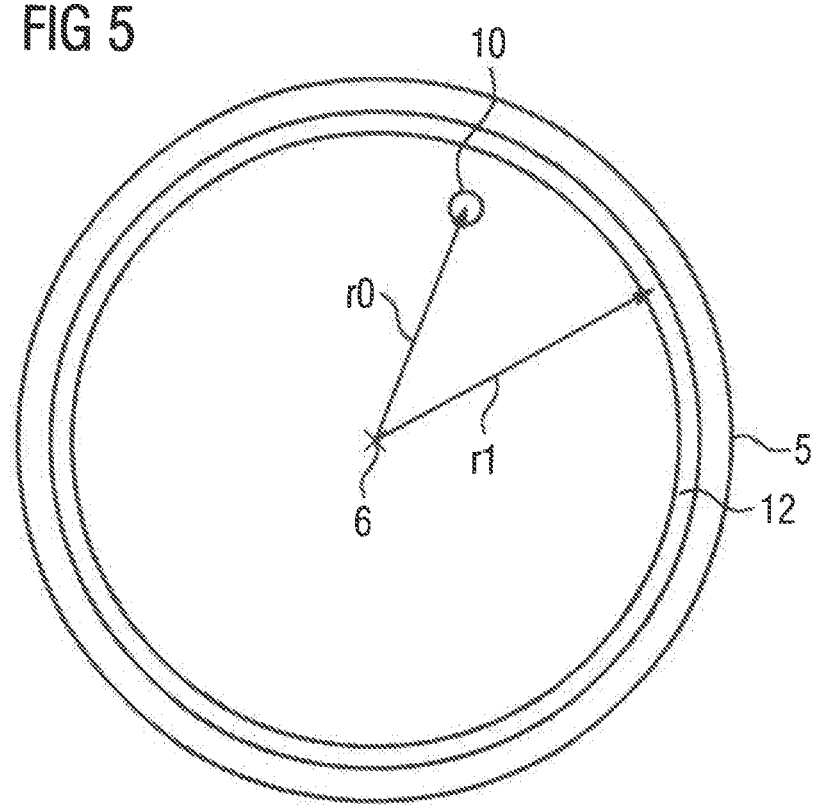
FIG. 5 a plan view of an alternative embodiment of a rotating element.

An alternative possibility for determining at least the radial distance r0, possibly also the axial reflector distance h0, is explained in more detail hereinafter in connection with FIG. 5. According to FIG. 5, an annular element 12 is arranged on the rotating element 5 in addition to the reflector element 10 at a radial annular distance r1 from the axis of rotation 6. The annular element 12 extends annularly around the axis of rotation 6. It thus forms a complete circular ring. The radial annular distance r1 can be greater than or less than the radial reflector distance r0 as required. However, it must not have the same value.

The annular element 12 is preferably designed such that it reflects a respective second transmission signal S2 (see FIG. 4) which is emitted by a respective transmitting antenna 8 (this is only shown for the antenna 8e in FIG. 4). However, the respective second transmission signal S2 has a different signal frequency f2 from the respective first transmission signal S1. In particular, it is possible to coordinate the reflector element 10, the annular element 12 and the signal frequencies f1, f2 with one another in such a way that the reflections originating from the annular element 12 do not, or at least only slightly, influence the first receiving signals E1. For example, the annular element 12 can be sufficiently narrow, viewed in the radial direction, so that it is not detected by means of the first receiving signals E1. In this case, the second signal frequencies f2 are generally considerably greater than the first signal frequencies f1, for example, at least five times as great.

The receiving antennae 8 receive the signal reflected by the annular element 12 as a respective second receiving signal E2. They supply their respective second receiving signal E2 to the evaluation device 11. In this case, the evaluation device 11 can correct the radial reflector distance r0 and/or determine the axial reflector distance h0 of the reflector element 10 from the antennae 8 and determine the position of rotation α of the rotating element 5 using the radial reflector distance r0 determined and/or the axial reflector distance h0 determined. To determine the radial reflector distance r0 and/or the axial reflector distance h0, as required, the evaluation device 11 can only evaluate the second receiving signals E2 supplied thereto or the second receiving signals E2 supplied thereto and second base signals B2 determined on the basis of the second transmission signals S2. For example, in the event that only the antenna 8e emits a second transmission signal S2, the evaluation device 11 can evaluate intensity fluctuations of the second receiving signals E2 and determine a periodic fluctuation of the radial reflector distance r0 and/or the axial reflector distance h0 based thereon. Appropriate procedures are generally known to those skilled in the art.

Hereinafter embodiments of the angular sensor of FIGS. 2 and 3 are explained in connection with FIGS. 6 and 7. However, these embodiments can also be realized without further ado in the alternative embodiment according to FIG. 5. Furthermore, the embodiment of FIG. 6 can also be combined with the embodiments of FIG. 7.

Figure 6:
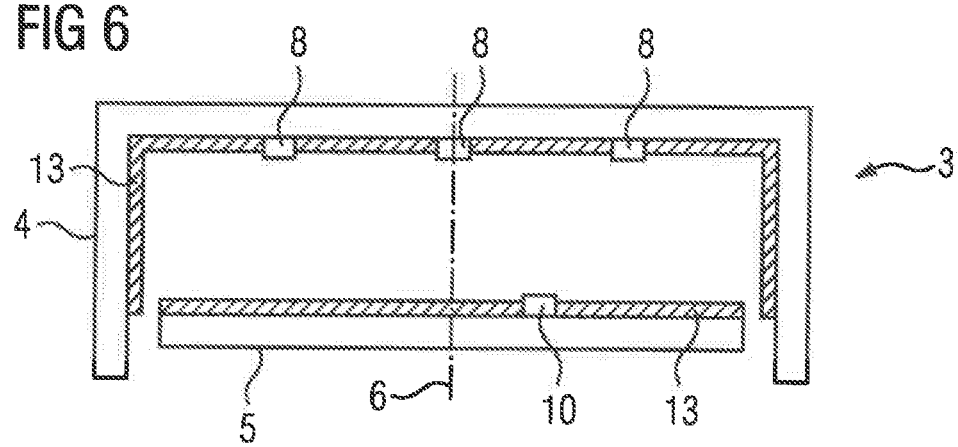
FIG. 6 a modification of the angular sensor von FIG. 2.

According to FIG. 6, absorber structures 13 are arranged on the base body 4 and/or on the rotating element 5. The absorber structures 13 at least absorb the first transmission signals S1 emitted by the transmitting antennae 8, preferably also the second transmission signals S2. In particular, the SNR (=signal-noise-ratio) can be optimized by this embodiment.

According to FIGS. 2 and 6, the reflector element 10 is arranged in a raised manner on the rotating element 5. The same also applies to the annular element 12, if appropriate. Alternatively, the reflector element 10 and if appropriate, also the annular element 12, could also be arranged on the rotating element 5 in a recessed manner. According to FIG. 7, conversely the reflector element 10 is arranged on the rotating element 5 in neither a raised nor a recessed manner but integrated into a printed circuit board structure 14. Here too, the same applies again for the annular element 12.

In summary, the present invention thus relates to the following facts:

An angular sensor has a base body 4 in which a rotating element 5 is mounted such that the rotating element 5 can be rotated about an axis of rotation 6. A number of transmitting antennae 8 that each emit a first transmission signal S1 is arranged on the base body 4. A reflector element 10 that extends only over part of the periphery, as observed tangentially in relation to the axis of rotation 6, and which reflects the respective first transmission signal S1 emitted by the respective transmitting antenna 8 is arranged on the rotating element 5 at a radial reflector distance r0 from the axis of rotation 6. A plurality of receiving antennae 8 is arranged on the base body 4, said receiving antennae respectively receiving the signal reflected by the reflector element 10 as a respective first receiving signal E1 and supplying their respective first receiving signal E1 to an evaluation device 11. The evaluation device 11 determines the position of rotation α of the rotating element 5 by evaluating only the first receiving signals E1 supplied thereto or by evaluating the first receiving signals E1 supplied thereto and first base signals B1 determined on the basis of the first transmission signals S1.

The present invention has many advantages. In particular, a highly accurate detection of the position of rotation α of the rotating element 5 is possible in a simple and reliable manner. The detection of the position of rotation α is possible at each position of rotation α. The radar technology has been implemented in a cost-effective and reliable manner. Contactless detection is carried out. The required assembly accuracy is relatively low. The angular sensor 3 operates in a robust manner, even in a harsh environment.

Although the invention has been illustrated and described in more detail by the preferred exemplary embodiment, the invention is not limited by the disclosed examples and other variations can be derived therefrom by a person skilled in the art without departing from the scope of the invention.

What is claimed is:

1. An angular sensor comprising:
   a base body;
   a rotating element mounted in the base body for rotation about an axis of rotation;
   a plurality of antennae, at least one of the plurality of antennae being a transmitting antenna arranged on the base body for emitting a first transmission signal, and at least two of the plurality of antennae being each a receiving antenna arranged on the base body;
   a reflector element arranged on the rotating element at a radial reflector distance from the axis of rotation, said reflector element configured to extend over part of a periphery, as observed tangentially in relation to the axis of rotation, for reflecting the first transmission signal onto the receiving antenna as a first receiving signal; and
   an evaluation device receiving the first receiving signal from each of the receiving antennae and determining a position of rotation of the rotating element by evaluating only the first receiving signals or by evaluating the first receiving signals and first base signals determined on the basis of the first transmission signals.

2. The angular sensor of claim 1, wherein the receiving antennae are arranged on the base body in a two-dimensionally distributed manner when viewed orthogonally to the axis of rotation.

3. The angular sensor of claim 2, wherein the receiving antennae are arranged on the base body in the form of a two-dimensional array with a plurality of rows and a plurality of columns.

4. The angular sensor of claim 1, wherein the evaluation device forms pairs of first signals, each of the pairs of first signals comprising two first receiving signals or one of the first receiving signals and one of the first base signals, said evaluation device configured to determine a phase difference between phases of each of the pairs of first signals and determining the position of rotation of the rotating element by evaluating the phase differences.

5. The angular sensor of claim 4, wherein the evaluation device is configured as a circuit operating according to a 6-port method, when evaluating the pairs of first signals.

6. The angular sensor of claim 4, wherein the plurality of antennae includes a plurality of said transmitting antennae, with the first transmission signal of each of the transmission antennae having a first signal frequency, wherein the transmitting antennae, the receiving antennae, and the first signal frequencies are coordinated in such a way that the phase difference between the phases of the first signals of each of the pairs of first signals varies by less than 360° for at least two of the pairs of first signals during a complete revolution of the reflector element around the axis of rotation.

7. The angular sensor of claim 4, wherein the evaluation device is configured to determine an axial reflector distance and/or the radial reflector distance of the reflector element from the transmitting antenna and the receiving antennae on the basis of the phase differences of the first signals and to determine the position of rotation of the rotating element taking into account the determined axial and/or radial reflector distances.

8. The angular sensor as of claim 1, further comprising an annular element extending annularly around the axis of rotation and arranged on the rotating element at a radial annular distance from the axis of rotation for reflecting a second transmission signal emitted by the transmitting antenna at a different signal frequency from the first transmission signal, said receiving antennae receiving the second transmission signal as a second receiving signal and supplying the second receiving signal to the evaluation device, said evaluating device by evaluating only the second receiving signals or by evaluating the second receiving signals and second base signals determined on the basis of second transmission signals correcting the radial reflector distance and/or determining an axial reflector distance of the reflector element from the transmitting antenna and the receiving antennae and determining the position of rotation of the rotating element using the determined radial reflector distance and/or the determined axial reflector distance.

9. The angular sensor of claim 1, further comprising absorber structures arranged on the base body and/or on the rotating element and configured to absorb the transmission signal emitted by the transmitting antenna.

10. The angular sensor of claim 1, wherein the reflector element is arranged raised or recessed on the rotating element or is integrated into a printed circuit board structure arranged on the rotating element.

* * * * *